(12) United States Patent
Gu et al.

(10) Patent No.: US 12,424,638 B2
(45) Date of Patent: Sep. 23, 2025

(54) CATHODE STRUCTURE OF FUEL CELL (71) Applicant: JIANGSU HORIZON NEW ENERGY TECHNOLOGIES CO. LTD., Zhangjiagang (CN)

(72) Inventors: Zhijun Gu, Shanghai (CN); Koschany Arthur, Shanghai (CN)

(73) Assignee: JIANGSU HORIZON NEW ENERGY TECHNOLOGIES CO. LTD., Zhangjiagang (CN)

( * ) Notice: Subject to any disclaimer, the term of this patent is extended or adjusted under 35 U.S.C. 154(b) by 1280 days.

(21) Appl. No.: 16/761,002

(22) PCT Filed: May 25, 2017

(86) PCT No.: PCT/CN2017/085899
§ 371 (c)(1),
(2) Date: Mar. 18, 2021

(87) PCT Pub. No.: WO2018/214098
PCT Pub. Date: Nov. 29, 2018

(65) Prior Publication Data
US 2021/0210767 A1 Jul. 8, 2021

(51) Int. Cl.
*H01M 8/1004* (2016.01)
*H01M 4/86* (2006.01)
(Continued)

(52) U.S. Cl.
CPC ........... *H01M 4/96* (2013.01); *H01M 4/8657* (2013.01); *H01M 4/8807* (2013.01);
(Continued)

(58) Field of Classification Search
None
See application file for complete search history.

(56) References Cited

U.S. PATENT DOCUMENTS

2004/0253504 A1* 12/2004 Mossman ............. H01M 4/861
429/434

FOREIGN PATENT DOCUMENTS

CN 1658422 A 8/2005
CN 1823443 A 8/2006
(Continued)

OTHER PUBLICATIONS

JP 2001135326 A—machine translation.*

*Primary Examiner* — Haixia Zhang
(74) *Attorney, Agent, or Firm* — Jacob M. Ward; Ward Law Office LLC (57) ABSTRACT

A cathode structure of a fuel cell is disclosed. The cathode structure comprises a cathode diffusion layer, wherein an air permeability adjusting structure is arranged around the cathode diffusion layer, and the cathode air permeability of the air permeability adjusting structure gradually varies in the flow direction of fluid. According to the cathode structure of a fuel cell, by means of arranging the air permeability adjusting structure, with variable cathode air permeability around the cathode diffusion layer, the difference caused by different temperatures and humidity is subtly compensated for, thus improving the problem of water accumulation or dehydration in a cathode structure of a fuel cell, and effectively improving the water management of the fuel cell.

10 Claims, 5 Drawing Sheets

(51) Int. Cl.
*H01M 4/88* (2006.01)
*H01M 4/90* (2006.01)
*H01M 4/96* (2006.01)

(52) U.S. Cl.
CPC ......... *H01M 4/886* (2013.01); *H01M 4/9008* (2013.01); *H01M 4/9083* (2013.01); *H01M 8/1004* (2013.01); *H01M 2004/8689* (2013.01)

(56) References Cited

FOREIGN PATENT DOCUMENTS

| | | |
|---|---|---|
| CN | 102089911 A | 6/2011 |
| CN | 102456891 A | 5/2012 |
| CN | 105917506 A | 8/2016 |
| JP | 2001135326 A | 5/2001 |

\* cited by examiner

CATHODE STRUCTURE OF FUEL CELL

CROSS-REFERENCE TO RELATED APPLICATIONS

This patent application is a United States National Stage of International Patent Application No. PCT/CN2017/085899, filed on May 25, 2017. The entire disclosure of the above patent application is hereby incorporated herein by reference.

FIELD

The present invention relates to a cathode structure of a fuel cell.

BACKGROUND

Fuel cells can directly convert hydrogen and oxygen into electricity with relatively high efficiency and the reaction byproduct is pure water, so the fuel cells are of the characteristics of energy-saving and environmental protection, etc. The major structure of a fuel cell can generally be divided into three types: cathode open air-cooled type, cathode enclosed air-cooled type and cathode enclosed liquid-cooled type.

For an air-cooled fuel cell, whether the fuel cell is a cathode open or a cathode enclosed type, the temperature near the air inlet is often relatively low, and it is prone to cause water accumulation that will affect the performance. The temperature near the air outlet is often relatively high, and it is prone to cause dehydration that will affect the performance. In cold areas or cold seasons, this problem is particularly obvious.

For a liquid air-cooled fuel cell, although the temperature difference between the cooling liquid inlet and the cooling liquid outlet of the fuel cell is relatively small, to further minimize this temperature difference, the cooling liquid circulating pump is often required to run at a high speed, which consume too much power.

In addition, for a cathode enclosed fuel cell, whether the fuel cell is an air-cooled type or a liquid-cooled type, because of the moisture absorption by the oxygen-supply air flow, the area near the oxygen-supply air flow inlet is prone to cause dehydration that will affect the performance.

SUMMARY

The technical problem to be solved by the present invention is to provide a new fuel cell cathode structure for purpose of overcoming the defects of water accumulation or dehydration because of the temperature and humidity difference of the fuel cell cathode according to the available technology.

The present invention solves the above technical problem with the following technical solutions.

A cathode structure of a fuel cell is provided according to the present invention. The structure comprises a cathode diffusion layer, and an air permeability adjusting structure is provided around the cathode diffusion layer, wherein the cathode air permeability of the air permeability adjusting structure gradually varies in the flow direction of fluid.

Preferably, the cathode air permeability of the air permeability adjusting structure gradually decreases from the cooling fluid inlet to the cooling fluid outlet.

Preferably, the cathode air permeability of the air permeability adjusting structure gradually increases from the oxygen-supply air flow inlet to the oxygen-supply air flow outlet.

Preferably, the air permeability adjusting structure is a mesh densely covered with air holes, and the mesh is provided between a cathode flow channel board and a cathode diffusion layer.

Preferably, the cathode air permeability of the mesh gradually decreases from the cooling fluid inlet to the cooling fluid outlet.

Preferably, the mesh, from the cooling fluid inlet to the direction of the cooling fluid outlet, is divided into three regions, which are a high-air-permeability region, a medium-air-permeability region, and a low-air-permeability region respectively, and the aperture of the air hole corresponding to the high-air-permeability region, the medium-air-permeability region and the low-air-permeability region gradually becomes smaller.

Preferably, the cathode diffusion layer is carbon paper; one side of the carbon paper facing a membrane electrode assembly is a spraying coating layer; the cathode filling layer contains a mixture of carbon powder and PTFE powder; and the cathode filling layer is the air permeability adjusting structure.

Preferably, the cathode air permeability of the filling layer gradually decreases from the cooling liquid inlet to the cooling liquid outlet.

Preferably, the cathode filling layer, from the cooling fluid inlet to the direction of the cooling fluid outlet, is divided into three regions, which are a low density region, a medium density region and a high density region respectively, and the spray density corresponding to the low density region, the medium density region and the high density region gradually increases.

Preferably, the side of the cathode flow channel board facing the cathode diffusion layer is provided with a flow channel layer, the flow channel layer has a plurality of flow channels from the oxygen-supply air flow inlet to the oxygen-supply air flow outlet, and the adjacent two channels form a ridge; the flow channel layer is the air permeability adjusting structure.

Preferably, the cathode air permeability of the flow channel layer gradually increases from the oxygen-supply air flow inlet to the oxygen-supply air flow outlet.

Preferably, the cathode flow channel layer is divided into three regions from the oxygen-supply air flow inlet to the direction of the oxygen-supply air flow outlet, which are a wide ridge region, a medium ridge region and a narrow ridge region respectively, and the width ratio of the flow channel in the wide ridge region, the medium ridge region and the narrow ridge region to the ridge gradually increases.

Based on the accordance with common knowledge in the art, the above preferable conditions can be arbitrarily combined to obtain preferable embodiments of the present invention.

The positive effect of the present invention is as follows: the cathode structure of a fuel cell, by means of providing an air permeability adjusting structure with variable cathode air permeability around the cathode diffusion layer, subtly compensates the difference caused by different temperatures and humidity, and hence improves the problem of water accumulation or dehydration inside a cathode structure of a fuel cell and effectively improves the water management of a fuel cell.

DESCRIPTION OF THE REFERENCE NUMBER IN FIGURES ARE AS FOLLOWS

Cathode flow channel board 1
Cathode diffusion layer 2
Cathode filling layer 3
Membrane electrode assembly 4
Mesh 5
Air hole 51
High-air-permeability region 52
Medium-air-permeability region 53
Low-air-permeability region 54
Carbon paper 6
Spraying coating layer 7
Low density region 71
Medium density region 72
High density region 73
Flow channel layer 8
Flow channel 81
Ridge 82
Wide ridge region 83
Medium ridge region 84
Narrow ridge region 85
Oxygen-supply air flow inlet 9
Oxygen-supply air flow outlet 10

DETAILED DESCRIPTION

The present invention will be further detailed below with reference to specific embodiments. However, the present invention is not limited to the scope of these embodiments.

The cathode structure of a fuel generally includes a cathode flow channel board 1, a cathode diffusion layer 2, and a cathode filling layer 3 which are provided in sequence. The cathode filling layer 3 and a membrane electrode assembly 4 fit with each other. The present invention provides a cathode structure of a fuel cell. The cathode structure includes a cathode diffusion layer 2. An air permeability adjusting structure is provided around the cathode diffusion layer 2, wherein the cathode air permeability of the air permeability adjusting structure gradually varies along with the fluid flow.

When designing the flow path of the cooling liquid, the cathode air permeability of the air permeability adjusting structure gradually decreases from the cooling liquid inlet to the cooling liquid outlet. When designing the flow path of the oxygen-supply air flow, the cathode air permeability of the air permeability adjusting structure gradually increases from the oxygen-supply air flow inlet to the oxygen-supply air flow outlet.

The present invention, by means of providing an air permeability adjusting structure with variable cathode air permeability around the cathode diffusion layer 2, subtly compensates the difference caused by different temperatures and humidity, and hence improves the problem of water accumulation or dehydration in the cathode structure of a fuel cell and effectively improves the water management of a fuel cell.

The preferable fuel cell according to the present invention is a proton-exchange-membrane fuel cell.

There is provided three embodiments of the cathode structure of a fuel cell according to the present invention, which are specified as followings.

As illustrated in FIG. 1 to FIG. 5, a first embodiment of the cathode structure of a fuel cell is shown according to the present invention. The air permeability adjusting structure includes a mesh 5 densely covered with air holes 51. The mesh 5 is provided between a cathode flow channel board 1 and a cathode diffusion layer 2. The cathode air permeability of the mesh 5 gradually decreases from the cooling liquid inlet to the cooling liquid outlet. Specifically, the mesh 5, from the cooling fluid inlet to the direction of the cooling fluid outlet, is divided into three regions, which are a high-air-permeability region 52, a medium-air-permeability region 53, and a low-air-permeability region 54 respectively. The aperture of the air hole 51 corresponding to the high-air-permeability region 52, the middle-air-permeability region 53 and the low-air-permeability region 54 gradually becomes smaller.

Figure 1:
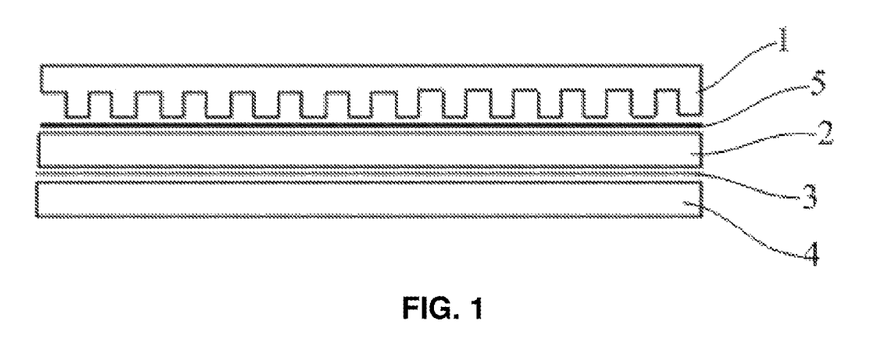
FIG. 1 illustrates a schematic diagram of the cathode structure of a fuel cell according to the first embodiment of the present invention.
Figure 2:
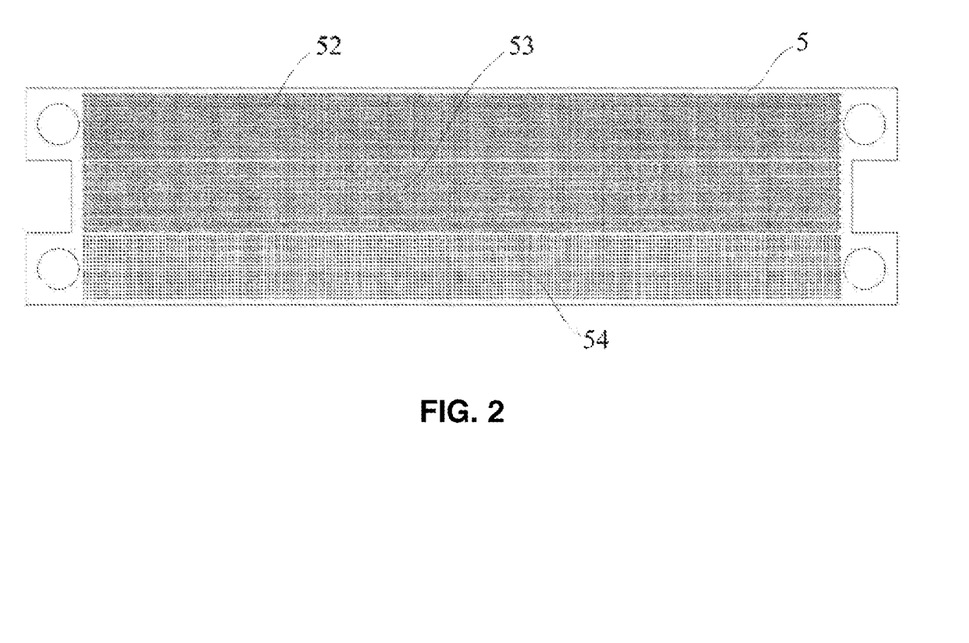
FIG. 2 illustrates a schematic diagram of the mesh according to the cathode structure of a fuel cell in FIG. 1.

As illustrated in FIG. 1, a front cross-sectional view is shown according to this cathode structure of a fuel cell, wherein the anode region beneath the membrane electrode assembly 4 is not shown because the region is unrelated to the present application and references can be made according to known knowledge. The mesh 5 as shown in FIG. 2 is flatly positioned between the cathode flow channel board 1 and the cathode diffusion layer 2. From the front view of FIG. 1 and from the near to the distant along the line of sight, there are the low-air-permeability region 54, the medium-air-permeability region 53 and the high-air-permeability region 52, respectively, of the mesh 5. The cooling fluid inlet is located on the back side of FIG. 1. The cooling fluid outlet is located on the front side of FIG. 1, and the cooling fluid flows in sequence through the regions of cathode flow channel board 1 corresponding to the high-air-permeability region 52, the medium-air-permeability region 53 and the low-air-permeability region 54, respectively.

The mesh 5 is provided between the cathode diffusion layer 2 and the cathode flow channel board 1 in each single cell of the fuel cell. The high-air-permeability region 52 corresponds to the cooling fluid inlet, and although the temperature is relatively low, the water accumulation is avoided because of the relatively high air permeability. The low-air-permeability region 54 corresponds to the cooling fluid outlet, and although the temperature is relatively high, the dehydration is avoided because of the relatively low air permeability.

Figure 3:
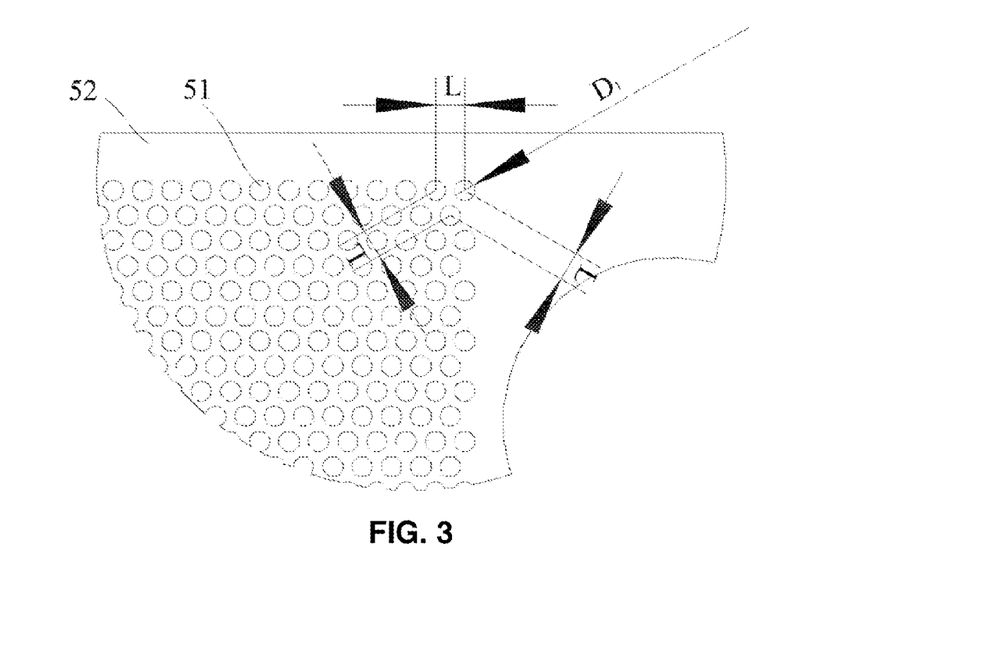
FIG. 3 illustrates a partially enlarged view of the high-air-permeability region according to the mesh in the cathode structure of a fuel cell shown in FIG. 2.
Figure 4:
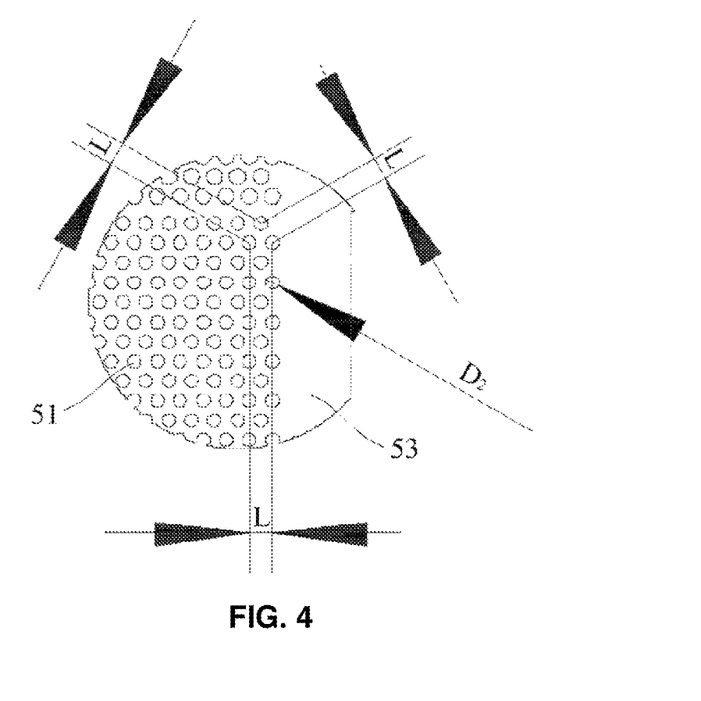
FIG. 4 illustrates a partially enlarged view of the medium-air-permeability region according to the mesh in the cathode structure of a fuel cell shown in FIG. 2.
Figure 5:
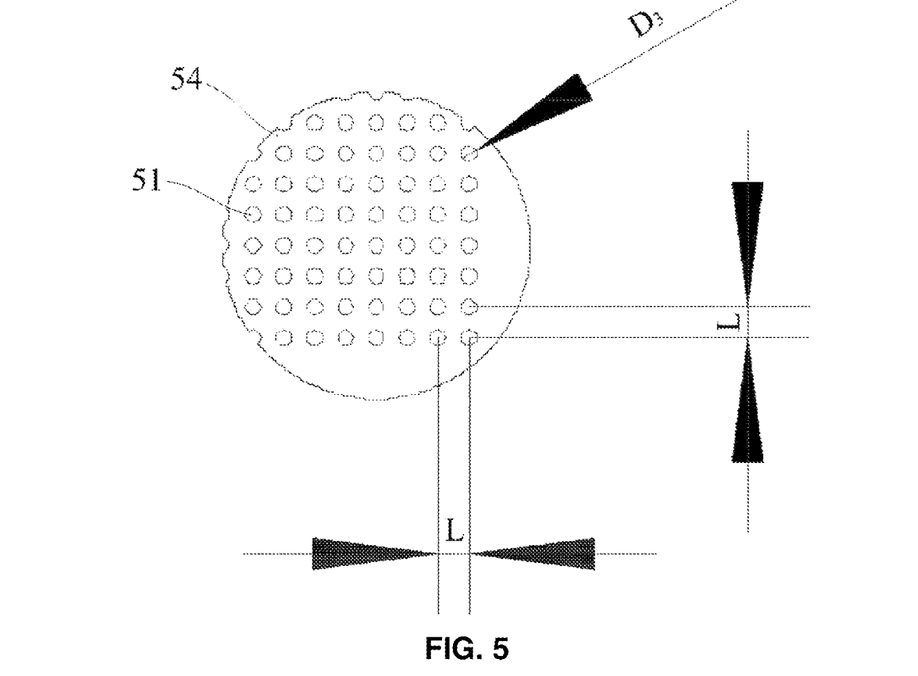
FIG. 5 illustrates a partially enlarged view of the low-air-permeability region according to the mesh in the cathode structure of a fuel cell shown in FIG. 2.

The preferable apertures of the air hole 51 on the mesh 5 are: the hole center distance L of the air holes 51 on the mesh 5 is 1 mm for all, the aperture D1 of the air hole 51 in the high-air-permeability region 52 is 0.7 mm (as illustrated in FIG. 3), the aperture D2 of the air hole 51 in the medium-air-permeability region 53 is 0.59 mm (as illustrated in FIG. 4), and the aperture D3 of the air hole 51 in the low-air-permeability region 54 is 0.5 mm (as illustrated in FIG. 5).

This embodiment is preferably applied in a cathode open fuel cell.

Figure 6:
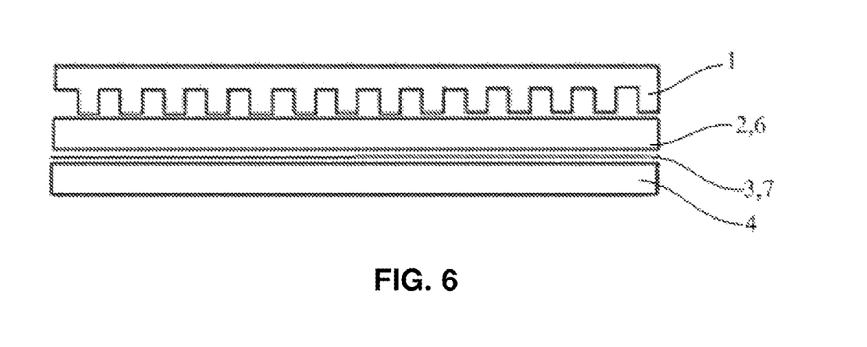
FIG. 6 illustrates a schematic diagram of the cathode structure of a fuel cell according to the second embodiment of the present invention.
Figure 7:
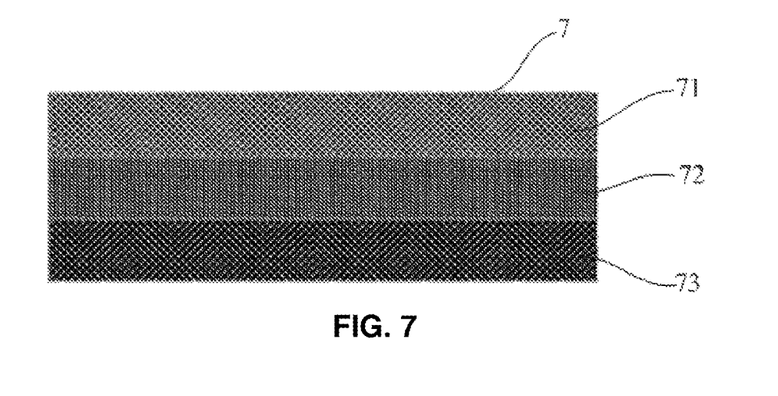
FIG. 7 illustrates a schematic diagram of the spraying coating layer according to the cathode structure of a fuel cell shown in FIG. 6.

As illustrated in FIG. 6 through FIG. 7, a second embodiment of the cathode structure of a fuel cell is shown according to the present invention. A cathode diffusion layer 2 is carbon paper 6. One side of the carbon paper 6 facing a membrane electrode assembly 4 is a spraying coating layer 7. The spraying coating layer 7 has a mixture of carbon powder and PTFE powder. The spraying coating layer 7 is the air permeability adjusting structure, and the cathode air permeability of the spraying coating layer 7 gradually decreases from the cooling liquid inlet to the cooling liquid outlet. Specifically, the spraying coating layer 7, from the cooling fluid inlet to the direction of the cooling fluid outlet, is divided into three regions, which are a low density region 71, a medium density region 72 and a high density region 73 respectively, and the spray density gradually increases in the low density region, the medium density region and the high density region.

The carbon paper itself is used as the cathode diffusion layer 2, and the carbon paper surface is sprayed with the mixture of carbon powder and PTFE powder which are then hot pressed to form the spraying coating 7, and the spraying coating 7 plays a role of an air permeability adjusting structure as well as a cathode filling layer 3. The specifications and ratio of the carbon powder and PTFE powder, and the temperature and pressure of the hot pressing are all referred to the known knowledge. Unlike the known knowledge, the spraying amount and/or times of the carbon powder and PTFE powder mixture in different regions are different, which form the low density region 71, the medium density region 72 and the high density region 73.

As illustrated in FIG. 6, a front cross-sectional view is shown according to the cathode structure of a fuel cell, in which the anode region beneath the membrane electrode assembly 4 is not shown because the region is unrelated to the present application, and references can be made according to the known techniques. From the front view of FIG. 6 and from the near to the distant along the line of sight, within the carbon filling layer 3 (i.e. the spraying coating layer 7), there are the high density region 73, the medium density region 72 and the low density region 71 respectively. The cooling fluid inlet is located on the back side of FIG. 6, while the cooling fluid outlet is located on the front side of FIG. 6. The cooling fluid flows in sequence through the regions of cathode flow channel board 1 corresponding to the low density region 71, the medium density region 72 and the high density region 73, respectively.

The carbon paper 6 sprayed with the spraying coating layer 7 is provided between the membrane electrode assembly 4 and the cathode flow channel board 1 in each single cell of the fuel cell. The carbon paper 6 serves as the cathode diffusion layer 2, and the spraying coating layer 7 (i.e. the carbon filling layer 3) is facing the membrane electrode assembly 4. The low density region 71 corresponds to the cooling fluid inlet, and although the temperature is relatively low, the water accumulation is avoided because of the relatively high air permeability. The high density region 73 corresponds to the cooling fluid outlet, and although the temperature is relatively high, the dehydration is avoided because of the relatively low air permeability.

The preferable air permeability of each region within the spraying coating layer 7 is: the air permeability of the low density region 71 is 0.7 cm3/(cm2.s), the air permeability of the medium density region 72 is 0.5 cm3/(cm2.s), and the air permeability of the high density region 73 is 0.35 cm3/(cm2.s).

This embodiment is preferably applied in a cathode open fuel cell.

Figure 8:
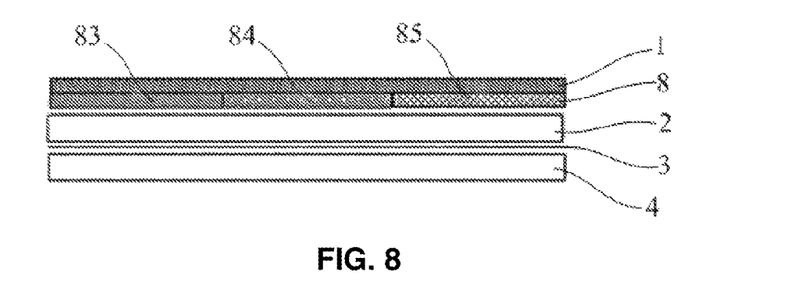
FIG. 8 illustrates a schematic diagram of the cathode structure of a fuel cell according to the third embodiment of in the present invention.
Figure 9:
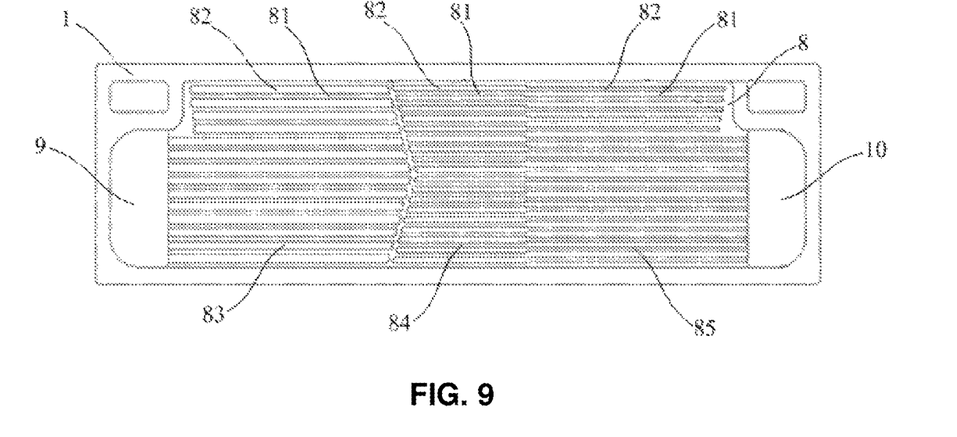
FIG. 9 illustrates a schematic diagram of the cathode flow channel board and the cathode flow channel layer according to the cathode structure of a fuel cell shown in FIG. 8.

As illustrated in FIG. 8 to FIG. 9, a third embodiment of the cathode structure of a fuel cell is shown according to the present invention. One side of a cathode flow channel board 1 facing a cathode diffusion layer 2 is provided with a flow channel layer 8, the flow channel layer 8 has a plurality of flow channels 81 from an oxygen-supply air flow inlet 9 to an oxygen-supply air flow outlet 10, and the adjacent two flow channels form the ridge 82; the flow channel layer 8 is the air permeability adjusting structure, and the cathode air permeability of the flow channel layer 8 gradually increases from the oxygen-supply air flow inlet 9 to the oxygen-supply air flow outlet 10. The cathode flow channel layer 8 is divided into three regions from the oxygen-supply air flow inlet 9 to the direction of the oxygen-supply air flow outlet 10, which are a wide ridge region 83, a medium ridge region 84 and a narrow ridge region 85, and the width ratio of the flow channel 81 in the wide ridge region 83, the medium ridge region 84 and the narrow ridge region 85 to the ridge 82 gradually increases.

As illustrated in FIG. 8, a front cross-sectional view is shown according to this cathode structure of a fuel cell, in which the anode region beneath the membrane electrode assembly 4 is not shown because the region is unrelated to the present application, and references can be made according to the known knowledge. The oxygen-supply air flow flows from the left side, in sequence through the wide ridge region 83, the medium ridge region 84 and the narrow ridge region 85 of the flow channel layer 8, and flows out from the right side.

As illustrated in FIG. 9, the cathode flow channel board 1 and the cathode flow channel layer 8 are shown according to this embodiment, the left side of which is the oxygen-supply air flow inlet 9, and the right side of which is the oxygen-supply air flow outlet 10. The width ratio of the flow channel 81 in the wide ridge region 83 to the ridge 82 is relatively low, and the air permeability is relatively low, which avoids the dehydration problem resulting from the large amount of moisture absorption by the dry oxygen-supply air flow just entering the fuel cell; the width ratio of the flow channel 81 in the medium ridge region 83 to the ridge 82 is relatively medium, the air permeability is relatively medium, the oxygen-supply air flow reaching this region has absorbed a small amount of moisture in the wide ridge region 83, and hence the air flow with certain amount of moisture will not absorb a large amount of moisture; the width ratio of the flow channel 81 in the narrow ridge region 85 to the ridge 82 is relatively high, the air permeability is relatively high, the oxygen-supply air flow reaching this region is already relative humid, and hence the air flow will not absorb a large amount of moisture even if the air permeability is relatively high.

The width of the flow channel 81 and the ridge 82 in each region of the flow channel layer 8 is: the width of the flow channel 81 in the wide ridge region 83 is 0.9 mm, and the width of the ridge 82 in the wide ridge region 83 is 1.8 mm; the width of the flow channel 81 in the medium ridge region 84 is 0.9 mm, and the width of the ridge 82 in the medium ridge region 84 is 1.2 mm; the width of the flow channel 81 in the narrow ridge region 85 is 1.2 mm, and the width of the ridge 82 in the narrow ridge region 85 is 0.9 mm.

This embodiment is preferably applied in a cathode enclosed fuel cell.

The present invention is not limited to the foregoing embodiments, and any change in the shape or structure of the embodiments falls within the protection scope of the present invention. The scope of the present invention is defined by the attached claims. Various changes or modifications can be made by those skilled in the art without departing from the principle and spirit of the present invention. However, these changes or modifications all fall within the scope of the present invention as well.

What is claimed is:

1. A cathode structure of a fuel cell, comprising: a cathode diffusion layer, wherein an air permeability adjusting structure is arranged around the cathode diffusion layer, and a cathode air permeability of the air permeability adjusting structure gradually varies along with fluid flow, wherein:
    the air permeability adjusting structure includes:
        a mixed layer between the cathode diffusion layer and a catalyst layer through which cooling fluid flows from a cooling fluid inlet at a back side to a cooling fluid outlet at a front side, and
        a flow channel layer having a plurality of flow channels adjacent to the cathode diffusion layer through which oxygen-supply air flows horizontally from an oxygen-supply air flow inlet to an oxygen-supply air flow outlet,
    wherein the cooling fluid and the oxygen-supply air flow through physically separate pathways, such that:
        the cooling fluid flows through density regions in the mixed layer having decreasing air permeability from the cooling fluid inlet to the cooling fluid outlet, and
        the oxygen-supply air flows through the flow channels having increasing air permeability from the oxygen-supply air flow inlet to the oxygen-supply air flow outlet.

2. The cathode structure of the fuel cell of claim 1, wherein the air permeability adjusting structure is a mesh densely covered with air holes, and the mesh is provided between a cathode flow channel board and the cathode diffusion layer.

3. The cathode structure of the fuel cell of claim 2, wherein the cathode air permeability of the mesh gradually decreases from the cooling fluid inlet to the cooling fluid outlet.

4. The cathode structure of the fuel cell of claim 2, wherein the mesh, from the cooling fluid inlet to the cooling fluid outlet, is divided into three regions, which are a high-air-permeability region, a medium-air-permeability region, and a low-air-permeability region respectively, and an aperture of the air holes corresponding to the high-air-permeability region, the middle-air-permeability region and the low-air-permeability region gradually becomes smaller.

5. The cathode structure of the fuel cell of claim 1, wherein the cathode diffusion layer is carbon paper; one side of the carbon paper facing a membrane electrode assembly is a cathode filling layer, and the cathode filling layer contains a mixture of carbon powder and PTFE powder; wherein the cathode filling layer is the air permeability adjusting structure.

6. The cathode structure of the fuel cell of claim 5, wherein the cathode air permeability of the cathode filling layer gradually decreases from the cooling liquid inlet to the cooling liquid outlet.

7. The cathode structure of the fuel cell of claim 5, wherein the cathode filling layer, from the cooling fluid inlet to the cooling fluid outlet, is divided into three regions, which are a low density region, a medium density region and a high density region respectively, and a spray density in the low density region, the medium density region and the high density region gradually increases.

8. The cathode structure of the fuel cell of claim 1, wherein one side of a cathode flow channel board facing the cathode diffusion layer is provided with a flow channel layer, the flow channel layer has a plurality of flow channels from an oxygen-supply air flow inlet to an oxygen-supply air flow outlet, and adjacent two channels form a ridge; wherein the flow channel layer is the air permeability adjusting structure.

9. The cathode structure of the fuel cell of claim 8, wherein the cathode air permeability of the flow channel layer gradually increases from the oxygen-supply air flow inlet to the oxygen-supply air flow outlet.

10. The cathode structure of the fuel cell of claim 8, wherein the cathode flow channel layer, from the oxygen-supply air flow inlet to the oxygen-supply air flow outlet, is divided into three regions, which are a wide ridge region, a medium ridge region and a narrow ridge region respectively; and a width ratio of the flow channel in the wide ridge region, the medium ridge region and the narrow ridge region to the ridge gradually increases.

* * * * *